US005107396A

United States Patent [19]

Rosen et al.

[11] Patent Number: 5,107,396

[45] Date of Patent: Apr. 21, 1992

[54] CIRCUIT BREAKER COMBINED TERMINAL LUG AND CONNECTOR

[75] Inventors: James L. Rosen, West Hartford; Donna C. DeRosier, Plainville, both of Conn.

[73] Assignee: General Electric Company, New York, N.Y.

[21] Appl. No.: 709,473

[22] Filed: Jun. 3, 1991

[51] Int. Cl.[5] .......... H02B 1/04

[52] U.S. Cl. .......... 361/355; 361/353; 361/363; 361/368; 361/376; 439/810; 439/814

[58] Field of Search .......... 335/6-10, 335/42, 43, 132, 202; 200/303, 293-296, 56 R; 439/769, 715, 716, 723, 724, 810, 814; 361/87, 93, 94, 331, 334, 341, 343, 346, 347, 350, 353-361, 363, 376, 364, 368, 372, 373, 426

[56] References Cited

U.S. PATENT DOCUMENTS

| | | | |
|---|---|---|---|
| 4,413,306 | 11/1983 | Erickson | 361/361 |
| 4,754,247 | 6/1988 | Raymont et al. | 335/202 |
| 4,809,132 | 2/1989 | Palmieri et al. | 361/353 |
| 4,868,981 | 9/1989 | Hinckley | 361/355 |
| 4,951,018 | 8/1990 | Schmiedel | 335/132 |
| 5,005,104 | 4/1991 | Grunert | 361/355 |
| 5,047,604 | 9/1991 | Grass | 200/294 |

*Primary Examiner*—Gerald P. Tolin
*Attorney, Agent, or Firm*—Richard A. Menelly

[57] ABSTRACT

An industrial-rated circuit breaker line and load terminal lug and connector for connection with the power distribution line and load cables also includes a receptacle that allows connection with an auxiliary device for load indication and voltage metering. The receptacle is in the form of an insulative sleeve arranged around a metal contact blade in electric circuit with the line and load lugs. Electrical connection with the line and load cables and the auxiliary device occurs when the combined terminal lug and connectors are connected with the power distribution line and load cables.

5 Claims, 2 Drawing Sheets

CIRCUIT BREAKER COMBINED TERMINAL LUG AND CONNECTOR

BACKGROUND OF THE INVENTION

U.S. Pat. No. 4,809,132 describes a field-installable line and load lug connector for an industrial-rated molded case circuit breaker. The lug connectors are provided in kit-form and are installed at the installation site. The insulative lug support cap on the bottom of the lugs provides added electrical insulation to the lugs and also serves to restrain the lugs from moving in the horizontal direction.

When industrial-rated circuit breakers such as described within U.S. Pat. No. 4,754,247 are used within electrical distribution circuits, the associated electrical equipment is usually located at a site remote from that of the circuit breakers. Electric voltage meters connected with the circuit breakers enable an operator to determine phase-to-phase voltage readings on the line or load terminal ends of the circuit breakers. Auxiliary wire conductors are attached to the circuit breaker terminals to provide the circuit connection with the voltage meters. When indicator lamps are connected to the terminals of the circuit breakers, to indicate that the electrical power distribution system is operational, auxiliary wire conductors are connected to the circuit breaker line terminals. When such connections are made in the field, the circuit breakers are de-energized, the circuit breaker line and load terminal lugs are drilled and tapped and the auxiliary wire conductors are connected by means of terminal screws.

A further example of an industrial-rated circuit breaker is described within U.S. patent application Ser. No. 650,275 filed Feb. 4, 1991 entitled "Molded Case Circuit Breaker Thermal-Magnetic Trip Accelerator" which Application is incorporated herein for purposes of reference.

It would be advantageous to enable auxiliary wire connection with the circuit breaker line and load terminal lugs without the use of such terminal screws from a standpoint of both safety and convenience.

One purpose of the invention, is to provide line and load terminal lugs for connecting industrial-rated circuit breakers within electrical power distribution systems which allow convenient and safe connection with auxiliary wire conductors.

SUMMARY OF THE INVENTION

The circuit breaker terminal lug and connector is formed from a standard metal lug connector to which a conductive strap is attached. An insulative sleeve electrically isolates the contact strap and the terminal lug from associated electrical equipment. An insulative projection in the form of an electrical receptacle allows a connector plug to be safely electrically-connected with the contact strap without further modification.

DESCRIPTION OF THE PREFERRED EMBODIMENT

Figure 1:
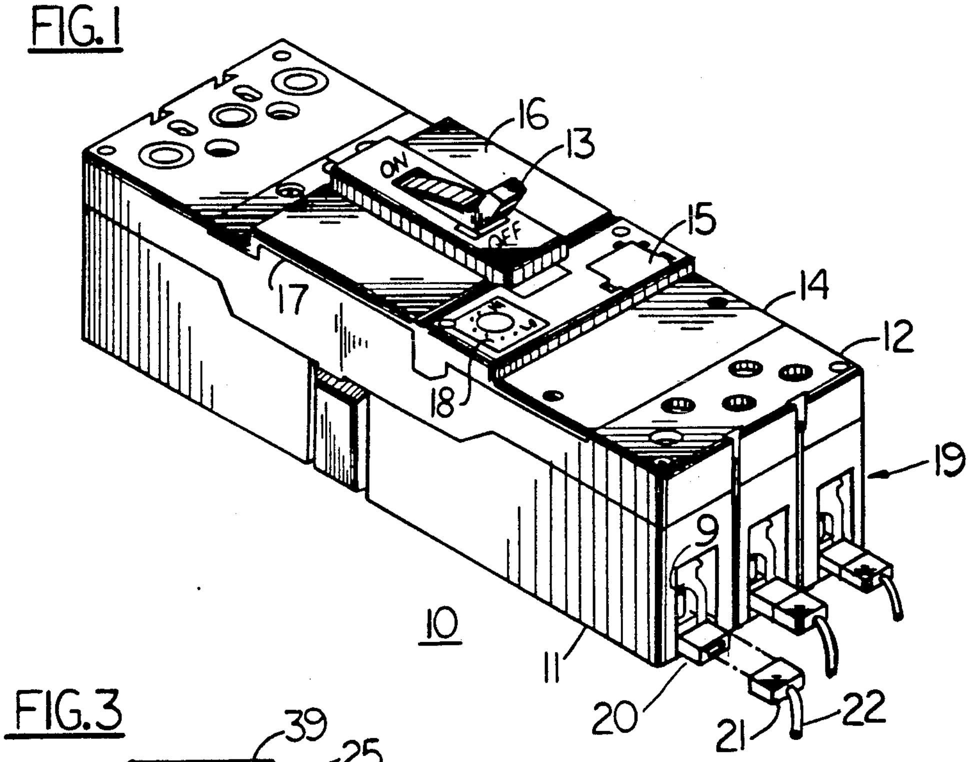
FIG. 1 is a top perspective view of an industrial-rated circuit breaker including the terminal lug and connector according to the invention.

An industrial-rated circuit breaker 10 such as that described in aforementioned U.S. Pat. No. 4,754,247 is depicted in FIG. 1. The circuit breaker consists of a plastic case 11 to which a plastic cover 12 is fixedly secured. The circuit breaker contacts are automatically driven to their open positions upon the occurrence of an overcurrent condition within the associated protected circuit. The circuit breaker contacts are also moved between their open and closed positions under quiescent circuit conditions by means of the circuit breaker operating handle 13. The accessory cover 14 is attached to the circuit breaker cover and provides access to a variety of accessories contained beneath the accessory doors 16, 17. A rating plug 15 sets the ampere rating of the circuit breaker while the switch 18 provides limited adjustment to the long-time overcurrent parameters. In accordance with the invention, a line and load terminal lug and connector assembly 19 hereafter "lug and connector" is inserted within each of the three line lug compartments 9 located at the line end of the circuit breaker. A similar load terminal lug and connector is connected within similar load lug compartments (not shown) located at the opposite end of the circuit breaker. The receptacle 20 formed on the front of the terminal lug and connector provides electrical connection with a plug 21 to allow electrical circuit with the line terminal lug assembly at a remote location over wire conductors 22.

Figure 2:
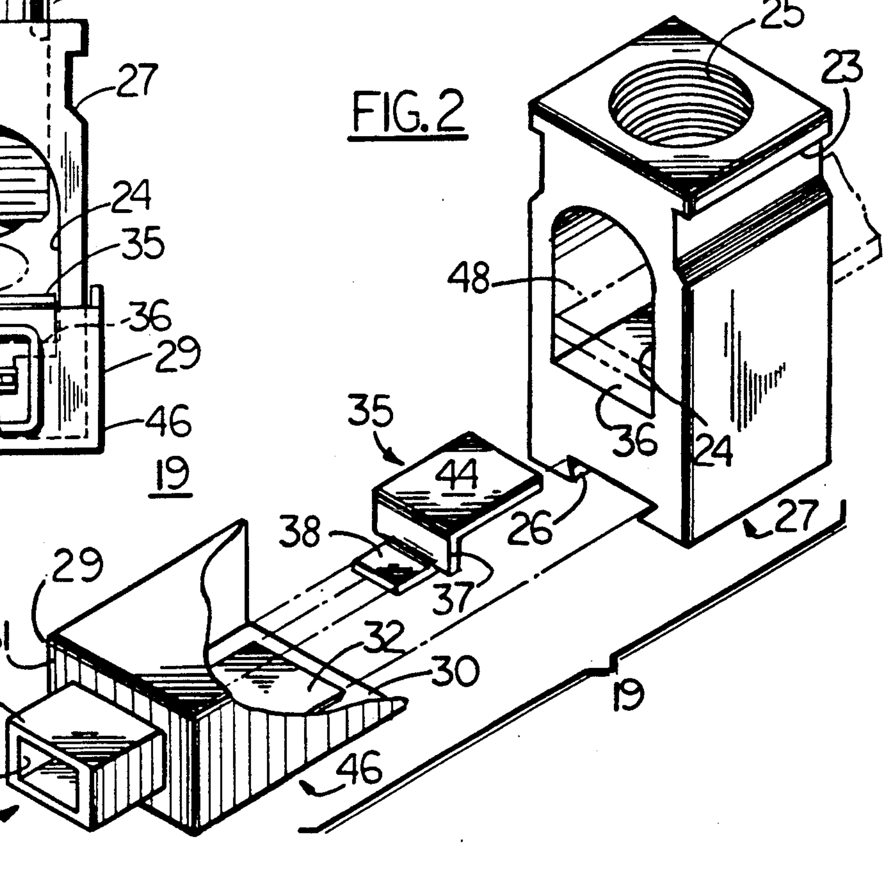
FIG. 2 is a top perspective view of the combined terminal lug and connector of FIG. 1 with the components in isometric projection prior to assembly.

The terminal lug and connector 19 is best seen by referring now to FIG. 2 where the terminal lug 27 is depicted as including an attachment slot 23, cable receiving slot 24 and threaded aperture 25, as indicated. The bottom surface 36 of the cable receiving slot 24 supports circuit breaker line or load straps 48 as indicated in phantom. The angulated metal strap 35 in turn sits on the strap for electrical connection with the terminal lug. The metal strap includes an off-set front 37 and a stab 38 that is parallel with the top 44 of the metal strap. When the metal strap is positioned within the cable receiving slot 24, the insulative sleeve 46 is fitted around the bottom of the terminal lug 27 by positioning the dove-shaped projection 32 formed on the bottom 30 of the sleeve in the dovetail channel 26 formed on the bottom surface of the terminal lug. The side walls 29 of the sleeve extend partway on both sides of the terminal lug and the front wall 31 abuts against the front surface of the terminal lug to exactly position the rectangular projection 33 on the front wall of the sleeve over the horizontal stab 38 such that the stab extends centrally within the rectangular channel 34 formed co-extensively within the rectangular projection to define the plug-receiving receptacle 20 shown earlier in FIG. 1.

Figure 3:
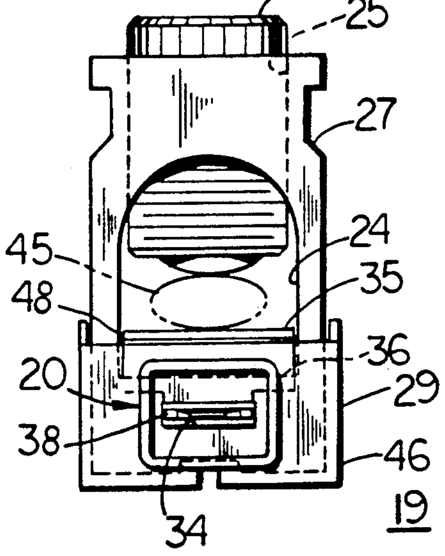
FIG. 3 is a front view of the terminal lug and connector of FIG. 2 after assembly.

The terminal lug and connector 19 is shown in FIG. 3 with a set screw 39 screwed within the threaded aperture 25 such that the bottom of the set screw extends within the cable receiving slot 24 in the terminal lug 27. The metal strap 35 is positioned within the cable-receiving slot 24 by the sides 29 of the insulative sleeve 46 and is pressed tightly against strap 48 which in turn is pressed against the bottom surface 36 of the terminal lug when the set screw 39 is torqued against the line or load cable 45 which is indicated in phantom. Electric circuit with the cable is made by means of the stab 38 extending centrally within the rectangular channel 34. The receptacle 20 accordingly electrically insulates the stab from contact except when connection is made through the front of the rectangular channel 34. Although the metal strap depicts a planar stab 38, the end of the stab can be formed-over to receive a planar stab within the plug-receiving receptacle 20 of FIG. 2, if so desired.

Figure 4:
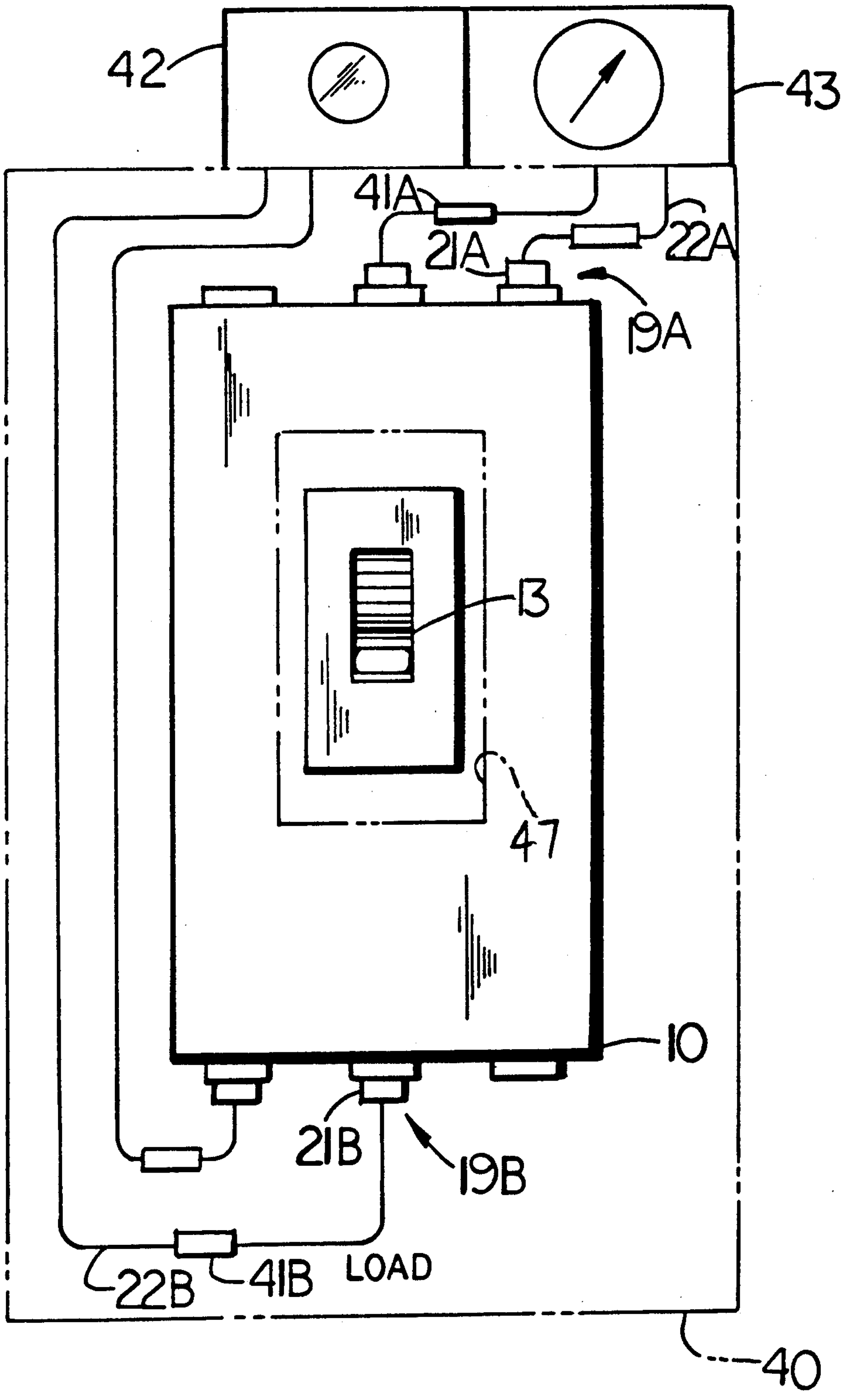
FIG. 4 is a front plan view of the industrial-rated circuit breaker of FIG. 1 connected with an indicator lamp and electric meter.

One application of the terminal lug and connector is shown in FIG. 4 wherein the circuit breaker 10 is positioned within a circuit breaker enclosure 40 as indicated in phantom and one pair of terminal lug and connectors 19A is attached to the line end of the circuit breaker and another pair of terminal lug and connectors 19B is attached to the load end of the circuit breaker. External access to the circuit breaker is made by the projection of the circuit breaker handle 13 through an aperture 47 formed within the front of the enclosure. The line terminal lug and connectors 19A electrically connect by means of plugs 21A and wire conductors 22A with an electric meter 43 located on the top of the enclosure. A pair of in-line fuses 41A protect the meter from overcurrent surges occurring on the line terminal cables (not shown). The load terminal lug and connectors 19B connect with an indicator lamp 42 also located on the top of the enclosure by means of the plug 21B, wire conductors 22B and similar in-line fuses 41B.

Having thus described our invention, what we claim as new and desire to secure by Letters Patent is:

1. An industrial-rated circuit breaker comprising in combination:
   - a plastic case and cover;
   - a pair of separable contacts within said case arranged for automatic separation upon occurrence of an overcurrent condition through said contacts;
   - an operating mechanism within said case operatively arranged for moving said contacts between closed and open conditions; and
   - a line terminal lug and connector arranged at one end of said case, said line terminal lug and connector including means providing electric connection with an electric power distribution line cable and electrically insulated means providing electrical connection between said line cable and a remote first electric device; wherein said line terminal lug and connector comprises a metal line terminal lug having a first aperture receiving said line terminal cable, a first metal strap within said first aperture providing electric circuit connection with said line terminal lug, a first insulative sleeve contacting both said line terminal lug and said first metal strap to electrically insulate both said line lug and said first metal strap.

2. The circuit breaker of claim 1 further including a load terminal lug and connector arranged at an opposite end of said case, said load terminal lug and connector including means providing electric connection with an electric power distribution load cable and electrically insulated means providing electrical connection between said load cable and a remote second electric device.

3. The circuit breaker of claim 2 wherein said load terminal lug and connector comprises a metal load terminal lug having a second aperture receiving said load terminal cable, a second metal strap within said second aperture providing electric circuit connection with said load terminal lug, a second insulative sleeve arranged on said load terminal lug and said second metal strap to electrically insulate both said load terminal lug and said second metal strap.

4. The circuit breaker of claim 1 including a first rectangular insulative projection extending from said first insulative sleeve, said first metal strap being arranged within said first insulative sleeve.

5. The circuit breaker of claim 3 including a second rectangular insulative projection extending from said second insulative sleeve, said second metal strap being arranged within said second insulative projection.

* * * * *